(12) United States Patent
Gann et al.

(10) Patent No.: US 11,856,928 B2
(45) Date of Patent: Jan. 2, 2024

(54) PORTABLE PET DRINKING CONTAINER (71) Applicant: PET ADVENTURE COMPANY LLC, Glendale, AZ (US)

(72) Inventors: Kenneth Gann, Phoenix, AZ (US); Mike Khodabakhshi, Winnetka, CA (US); Kyle Silkey, Chandler, AZ (US)

(*) Notice: Subject to any disclaimer, the term of this patent is extended or adjusted under 35 U.S.C. 154(b) by 0 days.

(21) Appl. No.: 17/513,537

(22) Filed: Oct. 28, 2021

(65) Prior Publication Data

US 2022/0125009 A1 Apr. 28, 2022

Related U.S. Application Data (60) Provisional application No. 63/106,604, filed on Oct. 28, 2020.

(51) Int. Cl.
*A01K 7/00* (2006.01)

(52) U.S. Cl.
CPC .................. *A01K 7/005* (2013.01)

(58) Field of Classification Search
CPC .... A01K 7/005; A01K 39/012; A01K 39/026; A01K 5/0135
USPC .......................................................... 119/74
See application file for complete search history.

(56) References Cited

U.S. PATENT DOCUMENTS

| | | | | |
|---|---|---|---|---|
| 3,076,435 A * | 2/1963 | Seymour | ................ | A01K 7/005 119/61.54 |
| 4,286,546 A * | 9/1981 | Moore | ................... | A01K 7/005 119/61.54 |
| 6,067,935 A * | 5/2000 | Rodes | ..................... | A01K 7/005 119/72 |
| 6,142,101 A * | 11/2000 | Pelsor | .................. | A01K 5/0135 119/61.54 |
| 6,148,767 A * | 11/2000 | Manchess | ................ | A01K 7/00 119/74 |
| 7,624,702 B1 * | 12/2009 | Fritz | ......................... | A01K 7/02 119/77 |
| 7,849,817 B1 * | 12/2010 | Warganich | ............... | A01K 7/02 119/77 |
| 10,492,466 B1 * | 12/2019 | LaMarche | ............. | B65D 41/04 |
| 2007/0245968 A1 * | 10/2007 | Iljas | ..................... | A01K 5/0135 119/61.54 |
| 2008/0072831 A1 * | 3/2008 | Jordan | ................... | A01K 7/005 119/61.55 |
| 2011/0239950 A1 * | 10/2011 | Harper | ..................... | A01K 7/02 119/74 |

(Continued)

*Primary Examiner* — Brady W Frazier
*Assistant Examiner* — Zoe Tam Tran
(74) *Attorney, Agent, or Firm* — Intellectual Property Consulting, LLC; Mark N. Melasky; Jared K. Rovira (57) ABSTRACT

A portable pet drinking container is provided. A container body defines an interior cavity operable to contain a fluid. A drinking bowl receiving port is defined by the container body. The drinking bowl receiving port is operable to receive and secure a drinking bowl. A horizontal retaining wall and vertical retaining wall is defined by the container body. A drinking bowl is included and has a circumferential periphery. A dynamic compression shoulder is defined by said drinking bowl. An O-ring positioned around the drinking bowl. When the drinking bowl is rotatably inserted into the drinking bowl receiving port, the O-ring is compressed by the horizontal retaining wall, the vertical retaining wall, the dynamic compression shoulder, and the circumferential periphery of the drinking bowl to create a seal.

20 Claims, 6 Drawing Sheets

(56) References Cited

U.S. PATENT DOCUMENTS

| | | | | |
|---|---|---|---|---|
| 2015/0189856 A1* | 7/2015 | Alexander | ............ | A01K 39/02 |
| | | | | 119/74 |
| 2016/0229590 A1* | 8/2016 | Smaldone | ............... | A01K 7/005 |
| 2016/0255806 A1* | 9/2016 | Babal | ..................... | A01K 7/005 |
| 2017/0042117 A1* | 2/2017 | Babal | ..................... | A01K 7/005 |
| 2017/0273276 A1* | 9/2017 | Padia | ..................... | B32B 25/08 |
| 2019/0307101 A1* | 10/2019 | Matheson | ............ | A01K 5/0135 |
| 2021/0137070 A1* | 5/2021 | Harper | .................... | A01K 5/01 |
| 2022/0007613 A1* | 1/2022 | Rice | ....................... | A01K 7/005 |

\* cited by examiner

PORTABLE PET DRINKING CONTAINER

CROSS-REFERENCE TO RELATED APPLICATIONS

This application claims priority to U.S. Provisional Patent Application No. 63/106,604, filed, Oct. 28, 2020, which is incorporated by reference in its entirety as if fully disclosed herein.

BACKGROUND OF THE INVENTION

Field of Invention

The present invention relates generally to portable drinking containers for pets.

General Background

Standard pet water containers and bowls can be difficult to use while away from home. The containers are not able to be strapped onto a backpack or rucksack for hiking and take up considerable space inside the pack. Current designs have a mid-point or high center of gravity which provides a tipping moment for container inversion. Additionally, many designs do not have a method of preventing decompression of seals due to handling or vibration.

SUMMARY OF THE INVENTION

In accordance with embodiments of the invention, a portable pet drinking container is provided. The portable pet drinking container includes a container body. An interior cavity is defined by the container body and is operable to contain a fluid. A drinking bowl receiving port is defined by the container body. The drinking bowl receiving port is operable to receive and secure a drinking bowl. A horizontal retaining wall is defined by the container body. A vertical retaining wall is defined by the container body. The portable pet drinking container includes a drinking bowl. The drinking bowl has a circumferential periphery. A dynamic compression shoulder is defined by the drinking bowl. An O-ring positioned around the circumferential periphery of said drinking bowl. When the drinking bowl is rotatably inserted into the drinking bowl receiving port, the O-ring is compressed by the horizontal retaining wall, the vertical retaining wall, the dynamic compression shoulder, and the circumferential periphery of the drinking bowl to create a seal.

In one embodiment, the drinking bowl receiving port defines threads operable to receive threads defined by the drinking bowl and the drinking bowl defines threads operable to receive threads defined by the drinking bowl receiving port.

In one embodiment, the cross section of the container body is trapezoidal.

In one embodiment, the portable pet drinking container includes a locking tab disposed on an interior surface of the container body and a locking tab receiving port defined by the drinking bowl. The locking tab engages the locking tab receiving port to prevent rotation of the drinking bowl after the drinking bowl is rotatably inserted into the container body.

In one embodiment, a fill hole is defined by the drinking bowl. A vent hole is defined by the drinking bowl. The vent hole is located a first distance from a bottom of the drinking bowl. A fluid contained in the container body enters the drinking bowl through the fill hole. The vent hole is operable to prevent the fluid entering the drinking bowl from reaching a level greater than the first distance from the bottom of the drinking bowl.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

Figure 1:
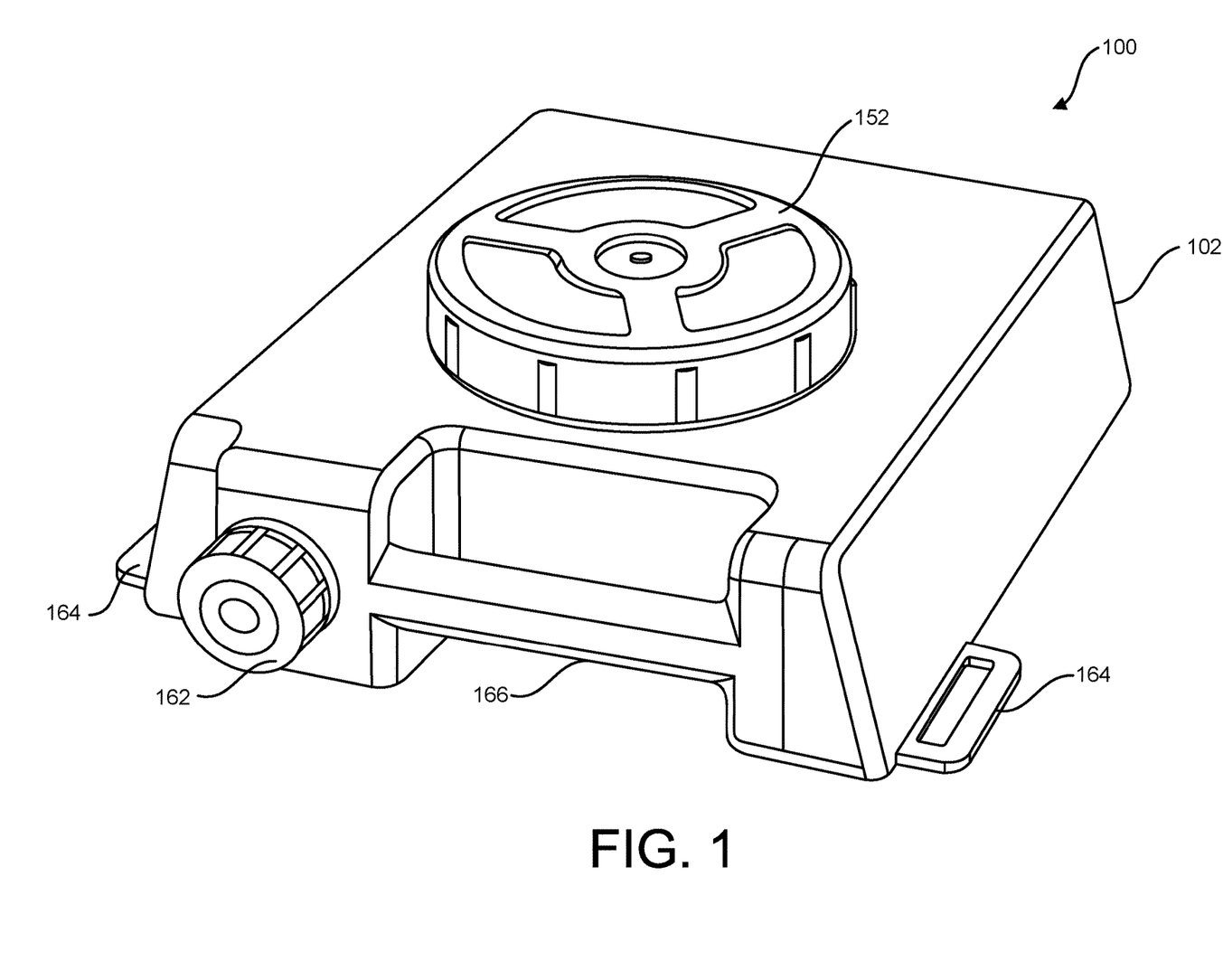
FIG. 1 depicts a perspective view of a portable pet drinking container in accordance with embodiments of the invention.
Figure 2:
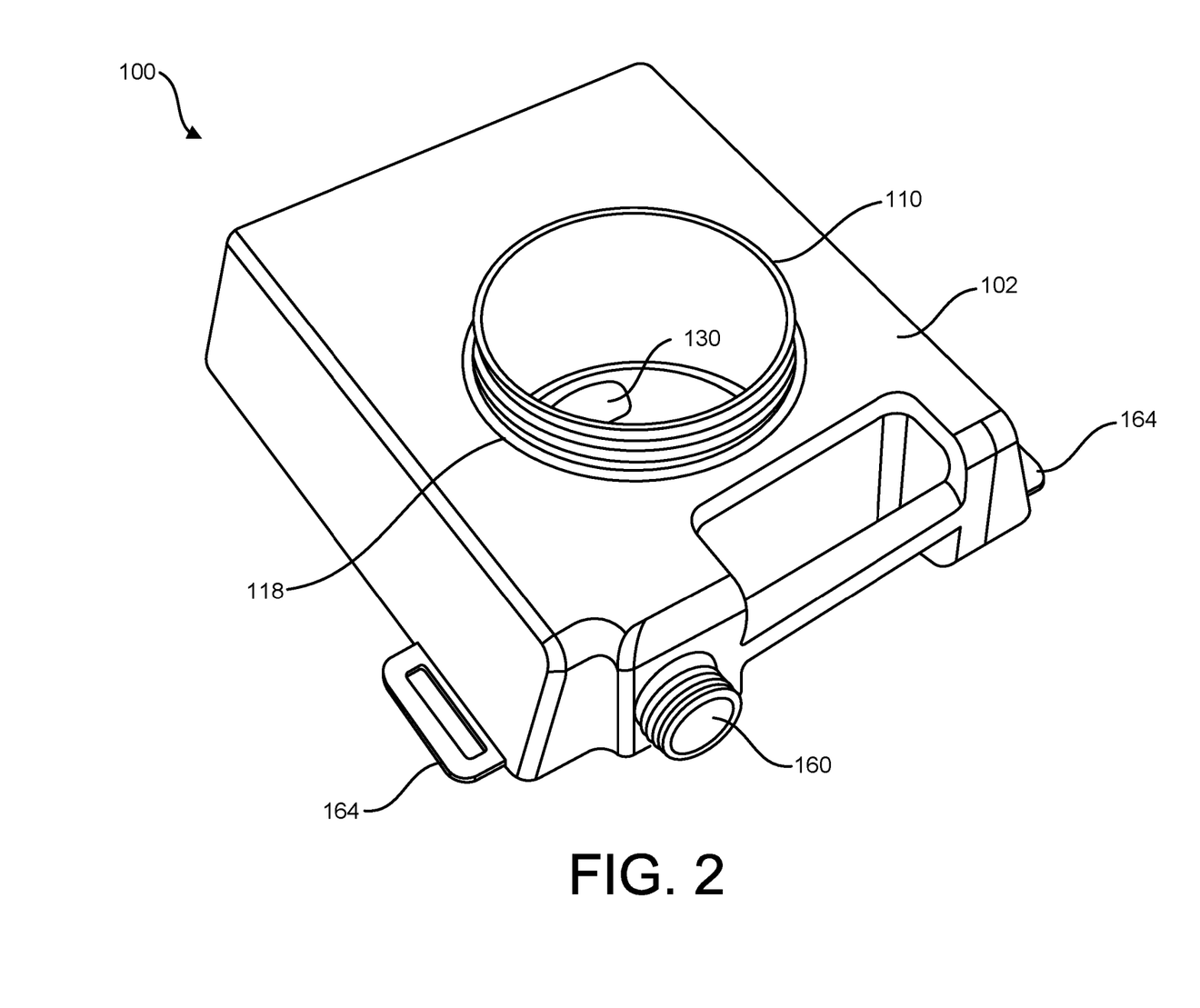
FIG. 2 depicts a perspective view of a portable pet drinking container with the lids removed in accordance with embodiments of the invention.
Figure 3:
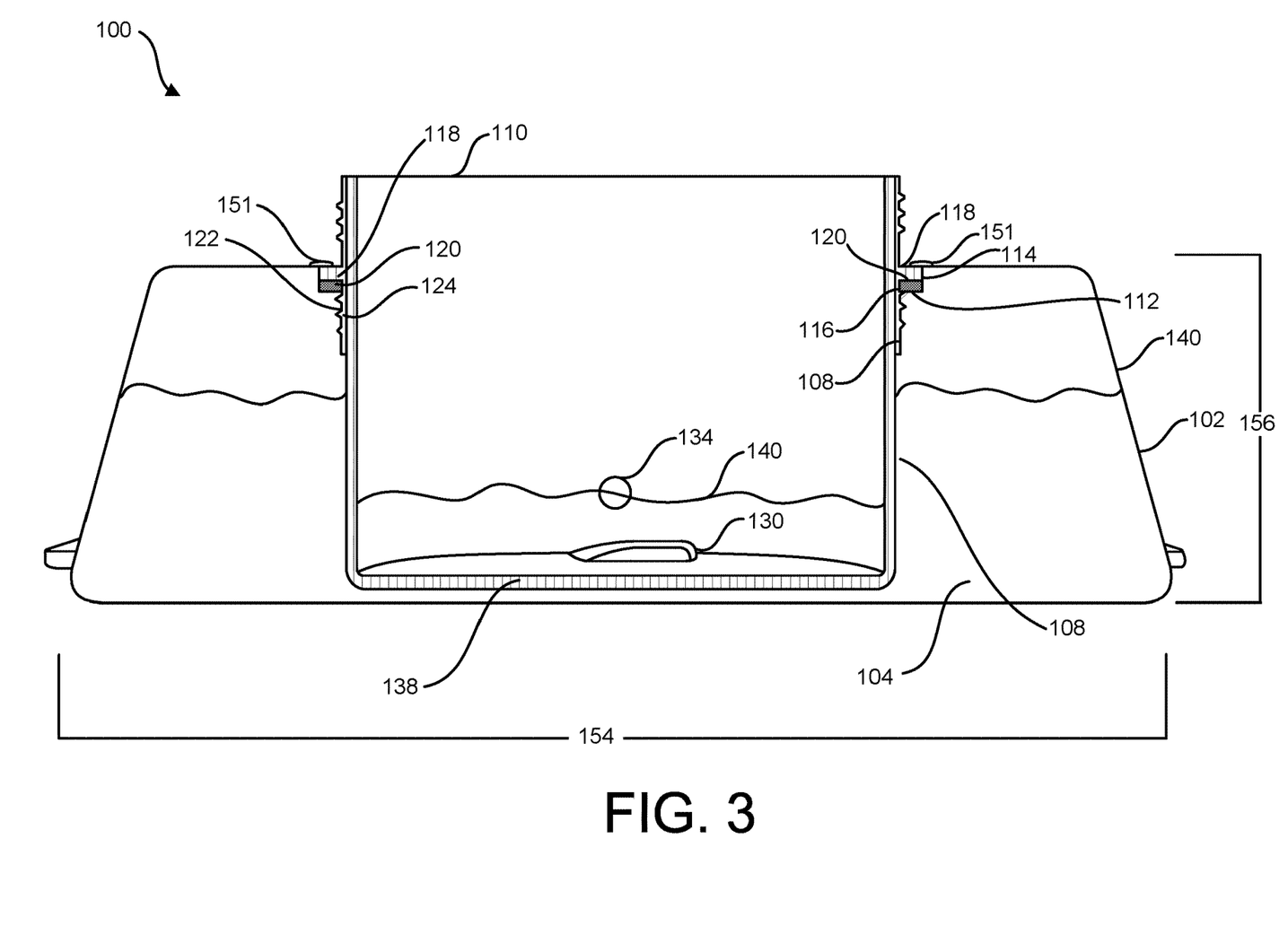
FIG. 3 depicts a cross-sectional side view of a drinking bowl in a container body of a portable pet drinking container in accordance with embodiments of the invention.

In accordance with embodiments of the invention, a portable pet drinking container 100 is provided, as illustrated in FIGS. 1-6. An object of the portable pet drinking container 100 is to enable a pet owner to carry the portable pet drinking container 100 to provide drinking water to a pet while minimizing the risk of spillage, either in transport or while a pet is drinking from the portable pet drinking container 100. The portable pet drinking container 100 is operable to moderate and automatically refill the amount of water available to a pet to minimize spillage. Referring to FIG. 1, the portable pet drinking container 100 includes a container body 102. An interior cavity 104 is defined by the container body 102 and is operable to contain a fluid 106, as illustrated in FIG. 3. A drinking bowl receiving port 108 is defined by the container body 102, as illustrated in FIG. 3. The drinking bowl receiving port 108 is operable to receive and secure a drinking bowl 110. A horizontal retaining wall 112 is defined by the container body 102. A vertical retaining wall 114 is defined by the container body 102. The horizontal retaining wall 112 extends radially inward from the vertical retaining wall 114. The portable pet drinking container 100 includes a drinking bowl 110. The drinking bowl 110 has a circumferential periphery 116. A dynamic compression shoulder 118 is defined by the drinking bowl 110. An O-ring 120 is positioned around the circumferential periphery 116 of said drinking bowl 110. The O-ring 120 may be a silicone gasket, for example. When the drinking bowl 110 is rotatably inserted into the drinking bowl receiving port 108, the O-ring 120 is compressed by the horizontal retaining wall 112, the vertical retaining wall 114, the dynamic compression shoulder 118, and the circumferential periphery 116 of the drinking bowl 110 to create a seal between the drinking bowl 110 and the container body 102, thereby preventing a fluid contained within the container body 102 from leaking around the circumferential periphery 116 of the drinking bowl 110. When the drinking bowl 110 is rotatably inserted into the drinking bowl receiving port 108, the dynamic compression shoulder 118 is flush with the container body 102.

Figure 4:
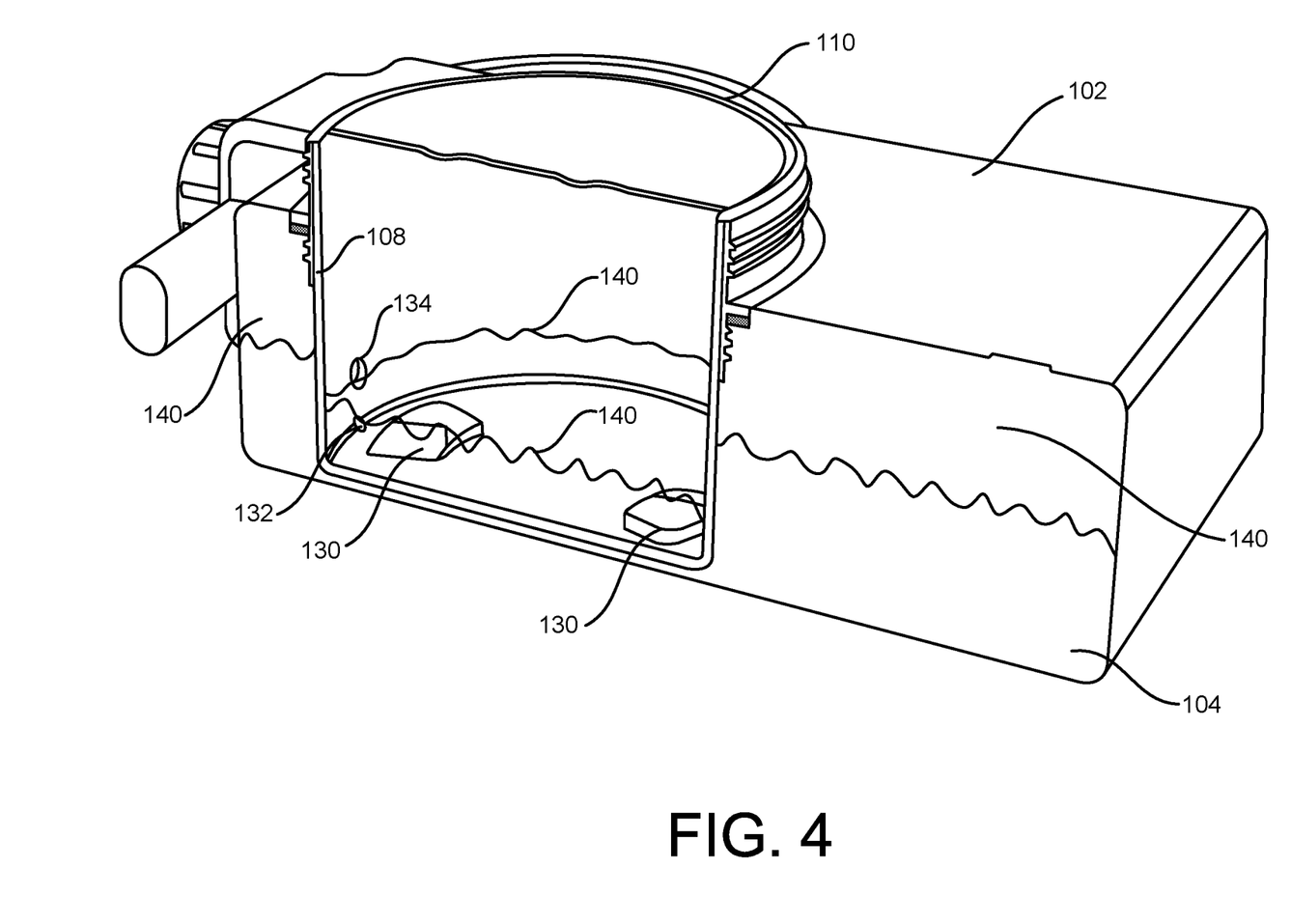
FIG. 4 depicts a cross-sectional perspective view of a drinking bowl in a container body of a portable pet drinking container in accordance with embodiments of the invention.

In one embodiment, as illustrated in FIGS. 3-4, the drinking bowl receiving port 108 defines threads 122 operable to receive threads 124 defined by the drinking bowl 110. The drinking bowl 110 defines threads 124 operable to receive threads 122 defined by the drinking bowl receiving port 108.

Figure 6:
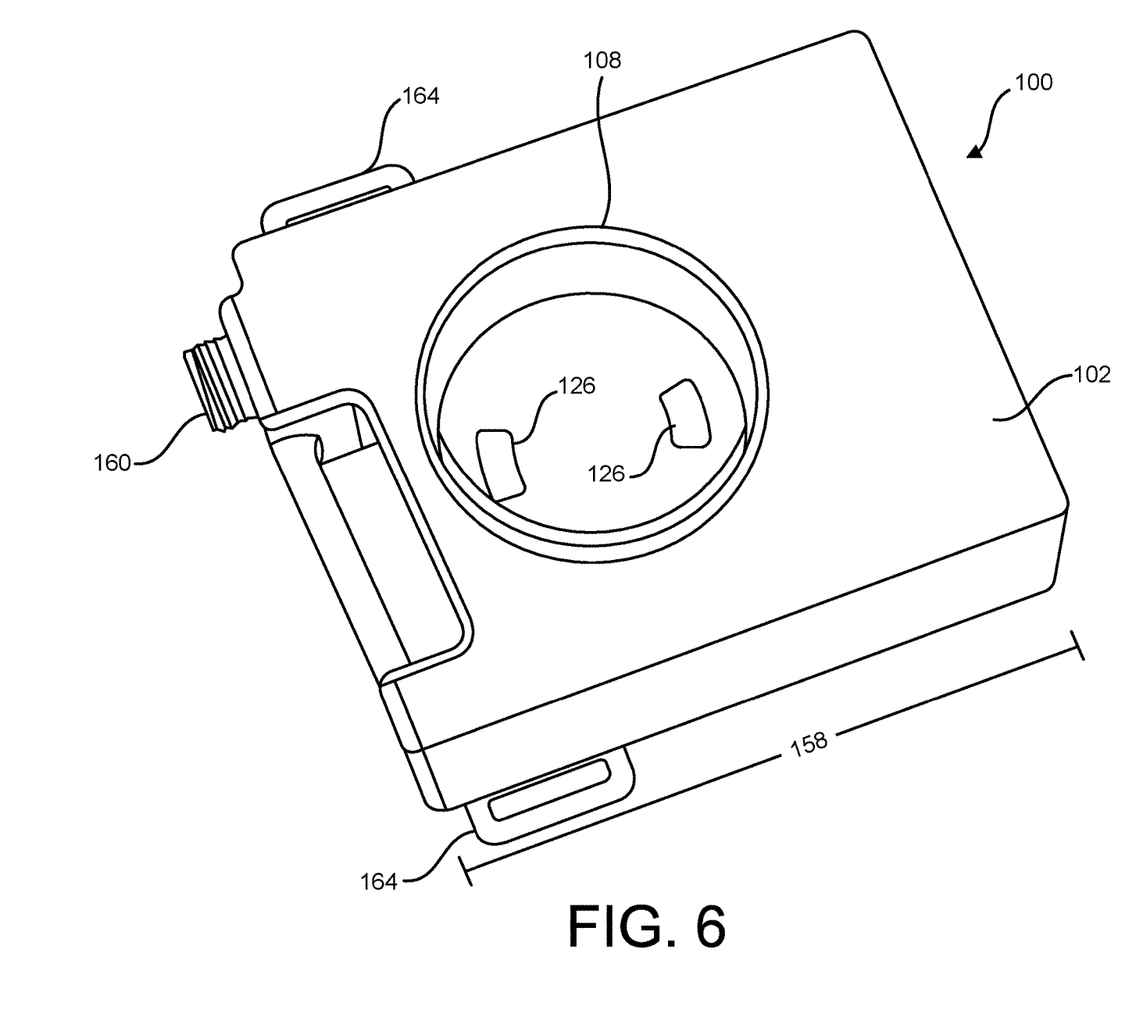
FIG. 6 depicts a perspective view of a portable pet drinking container with locking tabs in accordance with embodiments of the invention.

In one embodiment, the cross section of the container body 102 is trapezoidal, as illustrated in the Figures. A trapezoidal design of container body 102 is useful for a low center of gravity when a pet is actively drinking from the portable pet drinking container 100, as a low center of gravity keeps the container 100 upright, even when road or water conditions are bumpy. The trapezoidal design presents a downward force vector should another object or entity strike the container from the side, ensuring that the container 100 slides away from the force while remaining upright rather than tipping over and spilling any fluid contained in the drinking bowl 102. Even if the container 100 is momentarily jolted from the surface on which it resides, it lands flat due to the low center of gravity. Prior art designs have a mid-point or higher center of gravity which provides a tipping moment for container inversion. As illustrated in the Figures, container body 102 as a trapezoidal design with a center of gravity at or near the bottom of the container as most of the water is stored in the bottom 1 in of the container reservoir. The container body 102 has a length 154, a with 156, and a height 158. In one embodiment, as illustrated in FIGS. 3 and 6, the length 154 is 242.5 millimeters, the width 156 is 63.94 millimeters, and the height 158 is 258.7 millimeters.

In one embodiment, the portable pet drinking container 100 includes a locking tab 126 (FIG. 6) disposed on an interior surface 128 of the container body 102 and a locking tab receiving port 130 (FIGS. 3-4) defined by the drinking bowl 110. The locking tab 126 engages the locking tab receiving port 130 to prevent rotation of the drinking bowl 110 after the drinking bowl 110 is rotatably inserted into the container body 102. The portable pet drinking container 100 solves a problem with prior art containers utilizing bowls inserted into their respective containers. In prior art devices, when a drinking bowl comes loose, either from unscrewing a drinking bowl lid or due to shock and vibration over time, the loose bowl breaks the vacuum seal and the drinking bowl floods to the level of gravity, resulting in a high-water level in the bowl which renders assertions of minimized spills through low water levels inaccurate. The portable pet drinking container 100 has at least one locking tab 126 to prevent the drinking bowl 110 from backing out of the container body 102 due to low level shock and vibration over time or while unscrewing a drinking bowl lid 152 from lid threads 153. This design preserves the vacuum seal between the drinking bowl 110 and container body 102 to prevent the drinking bowl flooding to a level of gravity. In one embodiment, the drinking bowl lid 152 is 4.5 inches.

Figure 5:
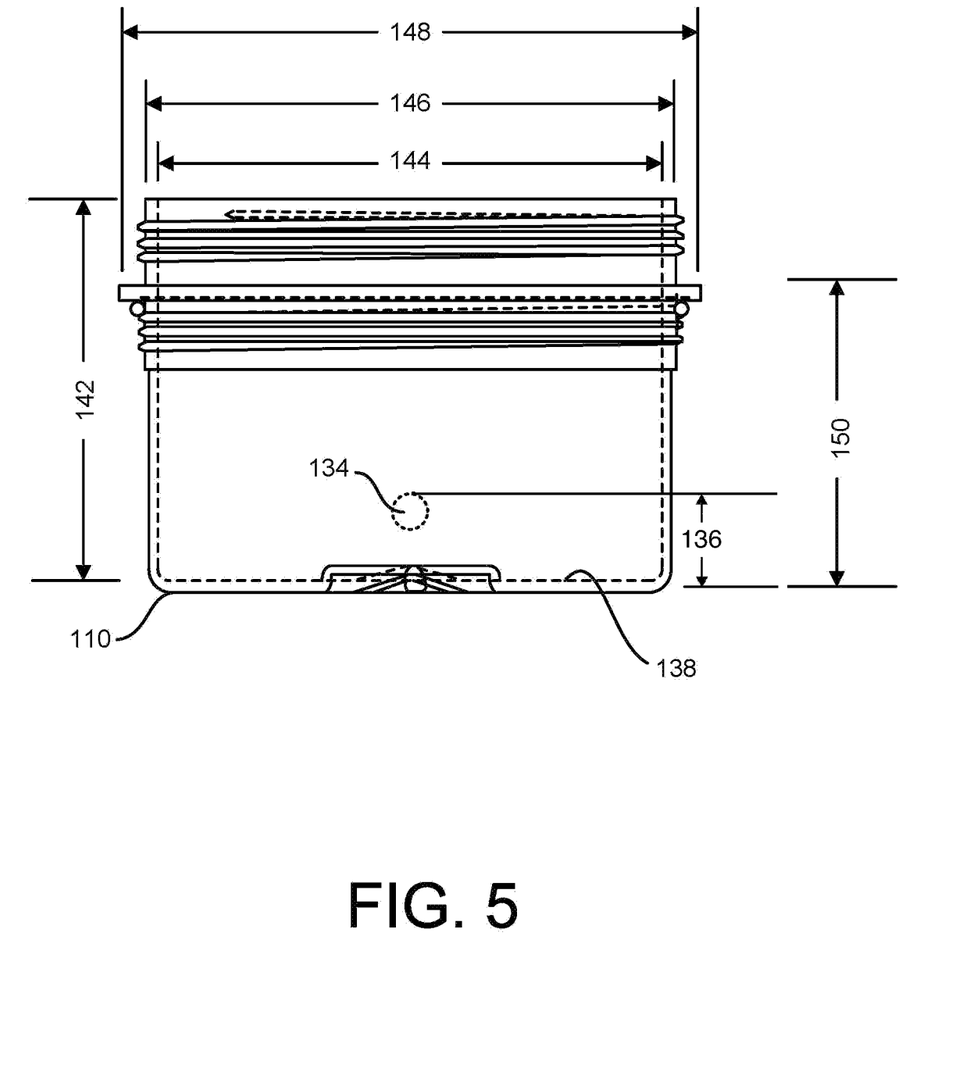
FIG. 5 depicts a side view of a drinking bowl of a portable pet drinking container in accordance with embodiments of the invention.

In one embodiment, a fill hole 132 is defined by the drinking bowl 110, as illustrated in FIGS. 3-5. A vent hole 134 is defined by the drinking bowl 110. The vent hole 134 is located a first distance 136 from a bottom 138 of the drinking bowl 110. A fluid 140 contained in the container body 102 enters the drinking bowl 110 through the fill hole 132. The vent hole 134 is operable to prevent the fluid 140 entering the drinking bowl 110 from reaching a level greater than the first distance 136 from the bottom 138 of the drinking bowl 110. As illustrated in FIGS. 3-4, the water line is at the middle point of the vent hole 134 and holding. With a proper seal of O-Ring 120, the water level only fills to the center of the vent hole 134. Once the water level drops below the vent hole 134, either from a pet drinking or spilling, the unit refills to that level. This moderates the amount of water or fluid that can enter the drinking bowl 110 from the container body 102 to minimize spillage from either rough terrain or an animal knocking the portable pet drinking container 100.

In one embodiment, as illustrated in FIG. 5, the drinking bowl 110 has a height 142, an inner diameter 144, an outer diameter 146, and a dynamic compression shoulder diameter 148. The dynamic compression shoulder 118 is located a second distance 150 from the bottom 138 of the drinking bowl 110. For example, the height 142 of the drinking bowl 110 is 76.3 millimeters, the inner diameter 144 of the drinking bowl 110 is 101.4 millimeters, the outer diameter 146 of the drinking bowl 110 is 106.68 millimeters, the dynamic compression shoulder diameter 148 is 115.8 millimeters, and the second distance is 58.94 millimeters. Vent hole 134 may have a diameter of 7 millimeters, for example.

In one embodiment, the drinking bowl 110 is rigidly adhered to the body 102. As illustrated in FIG. 3, the dynamic compression shoulder 118 is fixed to the body 102 by a weld 151. The weld 151 may formed by hot bar welding, air welding, an adhesive, or any suitable material operable to fuse the dynamic compression shoulder 118 is fixed to the body 102. Fixing the drinking bowl 110 is permanently fixed to the body 102 prevents displacement created by shock, vibration, rough handling, or occasional overfilling the container 100. The weld 151 is operable to withstand hydraulic pressures from a fluid contained within the body 102. The weld 151 extends 360 degrees around the perimeter of dynamic compression shoulder 118 and penetrates penetrate down into any gaps between layer 118 and body 102, preferably to a distance of twenty percent of the thickness of the dynamic compression shoulder 118. As illustrated in the Figures, the weld area of weld 151 is between 111 mm to 120 mm from the center of the drinking bowl 110 and applied 360 degrees around the cup. The weld 151 may be built up from between 0.008 inches to 0.020 inches above the surface of the container body 102 and the dynamic compression shoulder 118, for example.

In one embodiment, the portable pet drinking container 100 is made of a food grade polyethene material which includes a round injection molded drinking bowl 110 that screws into the container body 102 via an O-ring gasket 120.

As illustrated in the Figures, the portable pet drinking container 100 includes a fill hole 160 and a fill hole cap 162. The fill hole cap may be a 1.5 inch diameter lid with silicone gasket to seal the drinking container, for example.

Strap holders 164 may be molded into the portable pet drinking container 100 to connect to straps to enable the portable pet drinking container 100 to be carried as a backpack or as a rucksack for hiking, for example. A handle 166 may be molded into the portable pet drinking container 100.

In one embodiment, the drinking bowl 118 and the container body 102 are injected molded together as a single article.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A portable pet drinking container, comprising:
   a container body, said container body defining an interior cavity operable to contain a fluid;
   a drinking bowl receiving port defined by said container body, said drinking bowl receiving port operable to receive and secure a drinking bowl;
   a horizontal retaining wall defined by said container body;
   a vertical retaining wall defined by said container body;
   a drinking bowl, said drinking bowl having a circumferential periphery;
   a dynamic compression shoulder defined by said drinking bowl;
   wherein said horizontal retaining wall extends radially inward from said vertical retaining wall;
   an O-ring positioned around said circumferential periphery of said drinking bowl; and
   wherein when said drinking bowl has been rotatably inserted into said drinking bowl receiving port, said O-ring is compressed by said horizontal retaining wall, said vertical retaining wall, said dynamic compression shoulder, and said circumferential periphery of said drinking bowl.

2. The portable pet drinking container of claim 1, wherein said drinking bowl receiving port defines threads operable to receive threads defined by said drinking bowl.

3. The portable pet drinking container of claim 1, wherein said drinking bowl defines threads operable to receive threads defined by said drinking bowl receiving port.

4. The portable pet drinking container of claim 1, wherein a cross section of said container body is trapezoidal.

5. The portable pet drinking container of claim 1, further comprising:
   a locking tab disposed on an interior surface of said container body;
   a locking tab receiving port defined by said drinking bowl; and
   wherein said locking tab engages said locking tab receiving port to prevent rotation of said drinking bowl after said drinking bowl is rotatably inserted into said container body.

6. The portable pet drinking container of claim 1, further comprising:
   a fill hole defined by said drinking bowl; and
   a vent hole defined by said drinking bowl, said vent hole located a first distance from a bottom of said drinking bowl; and
   wherein a fluid contained in said container body enters said drinking bowl through said fill hole, and wherein said vent hole is operable to prevent said fluid entering said drinking bowl from reaching a level greater than said first distance from said bottom of said drinking bowl.

7. The portable pet drinking container of claim 1, wherein said drinking bowl has a height, an inner diameter, an outer diameter, and a dynamic compression shoulder diameter, wherein said dynamic compression shoulder is located a second distance from a bottom of said drinking bowl.

8. The portable pet drinking container of claim 1, wherein said height of said drinking bowl is 76.3 millimeters, said inner diameter of said drinking bowl is 101.4 millimeters, said outer diameter of said drinking bowl is 106.68 millimeters, said dynamic compression shoulder diameter is 115.8 millimeters, and said second distance is 58.94 millimeters.

9. The portable pet drinking container of claim 1, further comprising a weld permanently fixing said dynamic compression shoulder to said container body.

10. A portable pet drinking container, comprising:
    a container body, said container body defining an interior cavity operable to contain a fluid;
    a drinking bowl receiving port defined by said container body, said drinking bowl receiving port operable to receive and secure a drinking bowl;
    a horizontal retaining wall defined by said container body;
    a vertical retaining wall defined by said container body;
    a drinking bowl, said drinking bowl having a circumferential periphery;
    a dynamic compression shoulder defined by said drinking bowl;
    an O-ring positioned around said circumferential periphery of said drinking bowl;
    wherein when said drinking bowl has been rotatably inserted into said drinking bowl receiving port, said O-ring is compressed by said horizontal retaining wall, said vertical retaining wall, said dynamic compression shoulder and said circumferential periphery of said drinking bowl; and wherein when said drinking bowl has been rotatably inserted into said drinking bowl receiving port, said dynamic compression shoulder is flush with said container body.

11. The portable pet drinking container of claim 10, wherein said drinking bowl receiving port defines threads operable to receive threads defined by said drinking bowl.

12. The portable pet drinking container of claim 10, wherein said drinking bowl defines threads operable to receive threads defined by said drinking bowl receiving port.

13. The portable pet drinking container of claim 10, wherein a cross section of said container body is trapezoidal.

14. The portable pet drinking container of claim 10, further comprising:
a locking tab disposed on an interior surface of said container body;
a locking tab receiving port defined by said drinking bowl; and
wherein said locking tab engages said locking tab receiving port to prevent rotation of said drinking bowl after said drinking bowl is rotatably inserted into said container body.

15. The portable pet drinking container of claim 10, further comprising:
a fill hole defined by said drinking bowl; and
a vent hole defined by said drinking bowl, said vent hole located a first distance from a bottom of said drinking bowl; and
wherein a fluid contained in said container body enters said drinking bowl through said fill hole, and wherein said vent hole is operable to prevent said fluid entering said drinking bowl from reaching a level greater than said first distance from said bottom of said drinking bowl.

16. The portable pet drinking container of claim 10, wherein said drinking bowl has a height, an inner diameter, an outer diameter, and a dynamic compression shoulder diameter, wherein said dynamic compression shoulder is located a second distance from a bottom of said drinking bowl.

17. A portable pet drinking container, comprising:
a container body, said container body defining an interior cavity operable to contain a fluid;
a drinking bowl receiving port defined by said container body, said drinking bowl receiving port operable to receive and secure a drinking bowl;
a vertical retaining wall defined by said container body;
a horizontal retaining wall defined by said container body;
a drinking bowl, said drinking bowl having a circumferential periphery;
a dynamic compression shoulder defined by said drinking bowl;
wherein said horizontal retaining wall extends radially inward from said vertical retaining wall;
wherein when said drinking bowl has been rotatably inserted into said drinking bowl receiving port, said O-ring is compressed by said horizontal retaining wall, said vertical retaining wall, said dynamic compression shoulder and said circumferential periphery of said drinking bowl,
a weld;
wherein said drinking bowl is inserted into said drinking bowl receiving port; and
wherein said weld permanently fixes said dynamic compression shoulder to said container body.

18. The portable pet drinking container of claim 17, further comprising:
a fill hole defined by said drinking bowl; and
a vent hole defined by said drinking bowl, said vent hole located a first distance from a bottom of said drinking bowl; and
wherein a fluid contained in said container body enters said drinking bowl through said fill hole, and wherein said vent hole is operable to prevent said fluid entering said drinking bowl from reaching a level greater than said first distance from said bottom of said drinking bowl.

19. The portable pet drinking container of claim 16, wherein said height of said drinking bowl is 76.3 millimeters, said inner diameter of said drinking bowl is 101.4 millimeters, said outer diameter of said drinking bowl is 106.68 millimeters, said dynamic compression shoulder diameter is 115.8 millimeters, and said second distance is 58.94 millimeters.

20. The portable pet drinking container of claim 10, wherein an upper surface of said dynamic compression shoulder is flush with an upper surface of said container body.

* * * * *